(12) United States Patent
Guidi

(10) Patent No.: US 7,753,341 B2  
(45) Date of Patent: Jul. 13, 2010

(54) VALVE FOR CLOSING A SEAWATER PIPE

(75) Inventor: Bruno Guidi, Grignasco (IT)

(73) Assignee: Brunoguidi S.r.l., Grignasco (IT)

( * ) Notice: Subject to any disclaimer, the term of this patent is extended or adjusted under 35 U.S.C. 154(b) by 83 days.

(21) Appl. No.: 11/603,247

(22) Filed: Nov. 22, 2006

(65) Prior Publication Data

US 2008/0116408 A1    May 22, 2008

(51) Int. Cl.  
F16K 31/50    (2006.01)

(52) U.S. Cl. .................... 251/268; 251/335.2

(58) Field of Classification Search ......... 251/266–272, 251/331, 335.2; 92/98 D, 104  
See application file for complete search history.

(56) References Cited

U.S. PATENT DOCUMENTS

| | | | | |
|---|---|---|---|---|
| 1,693,407 A * | 11/1928 | Shand | ...................... | 251/335.2 |
| 2,638,309 A * | 5/1953 | Fortune | ...................... | 251/272 |
| 2,705,124 A * | 3/1955 | Price et al. | ................... | 251/331 |
| RE24,350 E * | 8/1957 | Price et al. | ................... | 251/266 |
| 2,845,084 A * | 7/1958 | Detlefson | ................. | 251/335.2 |
| 3,103,338 A * | 9/1963 | Marmo | ........................ | 251/45 |
| 3,157,383 A * | 11/1964 | Price | .......................... | 251/331 |
| 3,223,110 A * | 12/1965 | Mueller et al. | ........... | 251/335.1 |
| 3,246,872 A * | 4/1966 | Seltsam | ...................... | 251/331 |
| 3,306,570 A * | 2/1967 | Cooksley | ................. | 251/335.1 |
| 3,812,398 A * | 5/1974 | Kozel et al. | ................. | 251/331 |
| 4,280,680 A * | 7/1981 | Payne | ...................... | 251/335.2 |
| 5,029,813 A * | 7/1991 | Walton et al. | ............. | 251/335.2 |
| 5,213,124 A * | 5/1993 | Costa | .......................... | 251/43 |
| 5,316,273 A * | 5/1994 | Vaphiadis | ................... | 92/98 D |
| 6,948,517 B2 * | 9/2005 | Fukano et al. | .............. | 251/331 |

FOREIGN PATENT DOCUMENTS

IT    TO2004A000350    5/2004

* cited by examiner

Primary Examiner—John Bastianelli  
(74) Attorney, Agent, or Firm—Drinker Biddle & Reath LLP

(57) ABSTRACT

In a seawater pipe, a shut-off valve has a supporting body fixed to the pipe; a shutter movable between a forward closed position and a withdrawn open position; and a control member operated from outside the pipe to move the shutter via a transmission; the transmission is isolated in fluidtight manner from the seawater flowing in the pipe by a membrane; and the membrane has two edges, one fixed to the shutter, and the other forced radially between the supporting body and the pipe.

16 Claims, 1 Drawing Sheet

VALVE FOR CLOSING A SEAWATER PIPE

The present invention relates to a valve for closing a seawater pipe.

BACKGROUND OF THE INVENTION

In marine applications, hydraulic systems are known which cool marine engines by piping water directly from the sea along an intake pipe fitted with a safety valve which, in an emergency, can be operated manually or by means of an actuator to cut off the flow of seawater.

As is known, such valves comprise a control member, e.g. a handwheel or lever, outside the intake pipe; and a shutter, e.g. a ball or gate, operated by the control member with the interposition of a transmission. Being subject to continual aggression, oxidation, and/or erosion by the seawater flowing in the system, the transmission eventually tends to seize, thus making it difficult or impossible to close the shutter, especially if the valve is not operated or tested for prolonged periods of time.

SUMMARY OF THE INVENTION

It is an object of the present invention to provide a valve for closing a seawater pipe, designed to provide a straightforward, low-cost solution to the above problem.

According to the present invention, there is provided a valve for closing a seawater pipe; the valve comprising:
 a supporting body fixed to said pipe;
 a shutter movable, with respect to said supporting body, between a forward closed position closing the pipe, and a withdrawn open position opening the pipe;
 a control member rotated from outside said pipe to move said shutter; and
 transmission means for transmitting motion from said control member to said shutter;
 and being characterized by also comprising sealing means for isolating said transmission means in fluidtight manner from the seawater flowing, in use, in said pipe.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
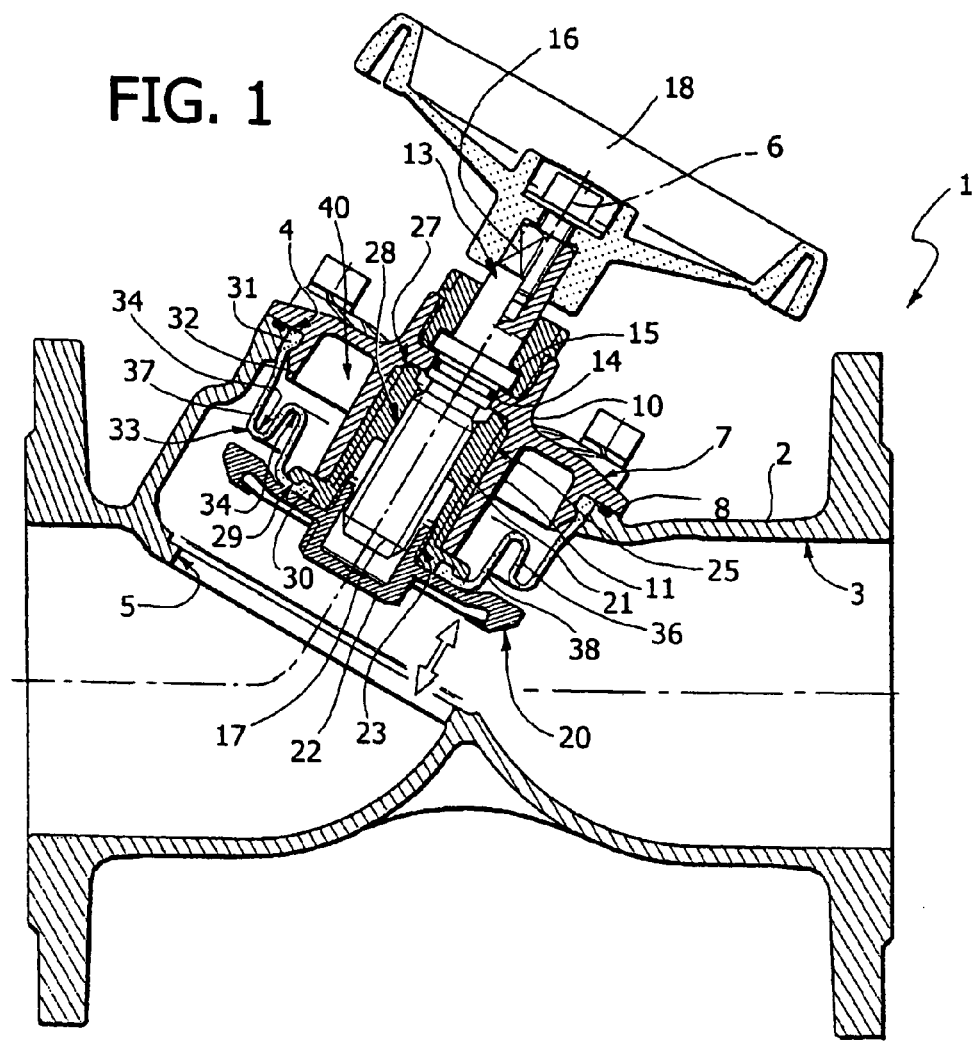
FIG. 1 shows a cross section of a preferred embodiment of a valve, in accordance with the present invention, for closing a seawater pipe, and shown in an open operating position.

Number 1 in FIG. 1 indicates a valve for closing a pipe 2 defining a seawater inlet of a marine engine cooling system (not shown).

Pipe 2 defines a passage 3 for seawater, and comprises a lateral hole 4; and a circular inner seat 5 coaxial with hole 4 along a fixed axis 6, and which is closed by valve 1 in case of emergency or for safety reasons.

Figure 2:
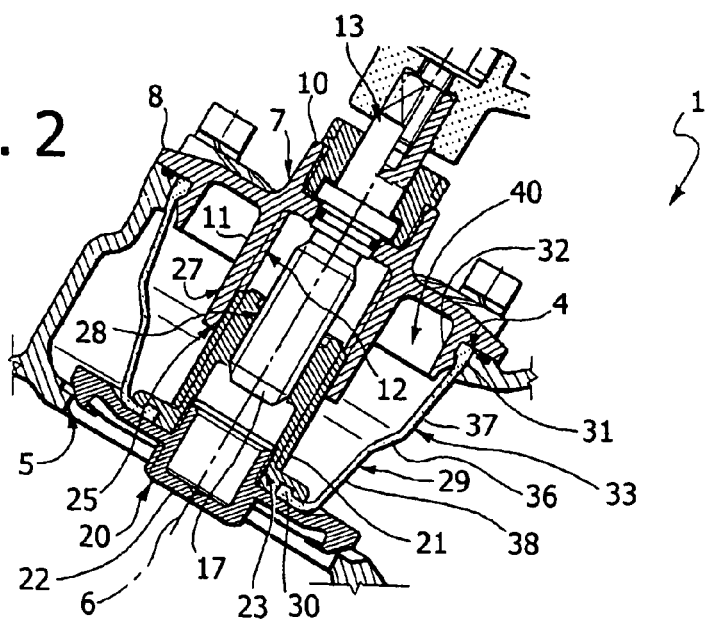
FIG. 2 is similar to FIG. 1, and shows a smaller-scale view, with parts removed for clarity, of the valve in a closed operating position.

Valve 1 comprises a supporting body 7, which closes hole 4 and in turn comprises an outer annular portion 8 fitted fluidtight and in a fixed position to pipe 2 in a manner not described in detail. Body 7 also comprises a central portion 10 with a hole, and which terminates axially with a tubular appendix 11 projecting inside pipe 2 and defining a cylindrical cavity 12 (FIG. 2).

Portion 10 supports a shaft 13 hinged to portion 10 about axis 6 with the interposition of sealing rings 14 and 15 made respectively of materials commonly known by the trade name "neoprene" (registered trade mark) and as "PTFE". More specifically, shaft 13 comprises two axial end portions 16, 17; portion 16 is located outside pipe 2 and fixed to a control handwheel 18; and portion 17 is threaded externally and extends inside cavity 12.

As shown in the accompanying drawings, valve 1 also comprises a shutter 20 defined by a mushroom-shaped body comprising a stem 21 and a head 22, which are defined by two separate bodies fixed to each other, e.g. by means of a threaded coupling 23.

Stem 21 is axially hollow, engages at least part of cavity 12, and is fitted to appendix 11 by an axial guide device 25, e.g. a splined coupling, so that shutter 20 is angularly fixed and movable axially between a withdrawn open position, in which head 22 is detached from seat 5, and a forward closed position, in which head 22 closes seat 5 in fluidtight manner.

Device 25 forms part of a transmission 27 for transmitting motion from handwheel 18 to shutter 20, and which comprises a screw-nut screw device 28, in which the screw is defined by portion 17, and the nut screw is defined by a threaded cylindrical inner surface of stem 21.

Transmission 27 is isolated in fluidtight manner from the seawater flowing in pipe 2 by a membrane 29 made of material known by the trade name "neoprene" (registered trade mark), and which comprises two opposite circular edges 30, 31 fixed to shutter 20 and body 7 respectively. More specifically, edge 30 is forced axially in fluidtight manner between stem 21 and head 22, and edge 31 is gripped radially in fluidtight manner between the peripheral edge of hole 4 and a circular appendix 32 extending axially and in one piece from portion 8 of body 7.

Membrane 29 is formed in one piece, and comprises an intermediate portion 33 which, in an undeformed condition (as shown in the FIG. 1 open position) is folded to form two bends 34 with their concavities facing in opposite axial directions.

In the undeformed condition, portion 33 comprises a substantially cylindrical central portion 36 between bends 34; and two substantially cylindrical lateral portions 37, 38 on opposite sides of bends 34.

When shutter 20 is translated into the forward closed position by rotating handwheel 18 (FIG. 2), membrane 29 is deformed elastically into a configuration in which portions 36, 37, 38 tend to align with one another, but with substantially no stretching in the direction joining edges 30, 31, on account of bends 34 and the length of portions 36, 37 allowing sufficient freedom of movement to compensate for the axial travel of shutter 20.

In actual use, valve 1 performs reliably even if unused for relatively prolonged periods of time, by virtue of membrane 29 protecting transmission 27 from contact with and, hence, aggression by seawater, by preventing seawater from entering a chamber 40 housing transmission 27 and made fluidtight by membrane 29 and rings 14, 15.

Device 25 prevents membrane 29 from twisting, while bends 34, as stated, provide for compensating for the axial travel of shutter 20 with no stretching. Besides being reliable, valve 1 is also easy to assemble, on account of edge 30 being preassembled to shutter 20, while edge 31 is forced radially between appendix 32 and pipe 2 automatically when inserting valve 1 inside hole 4, and so does not impair or complicate connection of portion 8 to pipe 2.

Clearly, changes may be made to valve 1 as described and illustrated herein without, however, departing from the scope of the present invention.

In particular, valve 1 may comprise a membrane 29 made of material other than "neoprene".

Membrane 29 may have a different number of bends 34, or may be replaced with a sealing device comprising more parts.

Finally, transmission 27 may differ from the one described, e.g. may be a cam type, and/or may be operated by an actuator as opposed to a manually-operated control member.

The invention claimed is:

1. A valve for closing a seawater pipe; the valve comprising:
   a supporting body fixed to said pipe;
   a shutter movable, with respect to said supporting body, between a forward closed position closing the pipe, and a withdrawn open position opening the pipe, wherein the shutter comprises a stem and head;
   a control member rotated from outside said pipe to move said shutter;
   transmission means for transmitting motion from said control member to said shutter; and
   sealing means for isolating said transmission means in fluidtight manner from the seawater flowing, in use, in said pipe;
   wherein said transmission means comprises a shaft hinged to said supporting body about an axis and rotated by said control member and an axial guide means for guiding said shutter along said axis;
   wherein said supporting body comprises a tubular appendix projecting inside said pipe;
   wherein said axial guide means is positioned radially between said stem of said shutter and said tubular appendix;
   wherein said axial guide means is configured to render said shutter angularly fixed;
   wherein said head comprises a tubular projection positioned radially within a hollow cavity of said stem; and
   wherein said head and said stem each comprise a hollow cavity capable of receiving at least a portion of the shaft.

2. A valve as claimed in claim 1, wherein said sealing means comprise a one-piece membrane.

3. A valve as claimed in claim 2, wherein said membrane comprises an intermediate portion which, when undeformed, has at least one bend.

4. A valve as claimed in claim 3, wherein, when undeformed, said intermediate portion has two bends with opposite concavities.

5. A valve as claimed in claim 4, wherein, when undeformed, said intermediate portion comprises a substantially cylindrical central portion between said bends; and two substantially cylindrical lateral portions on opposite sides of said bends.

6. A valve as claimed in claim 2, wherein, said membrane comprises a first annular edge and a second annular edge opposite each other; the first edge being fixed in fluidtight manner to said shutter; and the second edge being forced radially in fluidtight manner between an appendix of said supporting body and said pipe.

7. A valve as claimed in claim 6, wherein said first annular edge is forced axially in fluidtight manner between said stem and head of said shutter.

8. A valve as claimed in claim 2, wherein, said membrane is made of polychloroprene.

9. A valve as claimed in claim 1, wherein said transmission means further comprises:
   a screw-nut screw means interposed between said shaft and said shutter.

10. A valve as claimed in claim 1, wherein said tubular appendix defines a cylindrical cavity.

11. A valve as claimed in claim 1, wherein said tubular appendix is positioned radially between said stem of said shutter and said sealing means.

12. A valve as claimed in claim 1, wherein said axial guide means is positioned radially between said stem of said shutter and said sealing means.

13. A valve as claimed in claim 1, wherein said stem and the tubular projection of the head of said shutter are two separate bodies fixed to each other.

14. A valve as claimed in claim 13, wherein said stem and head are fixed to each other by a threaded coupling.

15. A valve as claimed in claim 1, wherein at least portions of both the head and the stem are located within an opening in said sealing means.

16. A valve for closing a seawater pipe; the valve comprising:
    a supporting body fixed to said pipe;
    a shutter movable, with respect to said supporting body, between a forward closed position closing the pipe, and a withdrawn open position opening the pipe, wherein the shutter comprises a stem and head;
    a control member rotated from outside said pipe to move said shutter;
    transmission means for transmitting motion from said control member to said shutter; and
    sealing means for isolating said transmission means in fluidtight manner from the seawater flowing, in use, in said pipe;
    wherein said transmission means comprises a shaft hinged to said supporting body about an axis and rotated by said control member and an axial guide means for guiding said shutter along said axis;
    wherein said head and said stem each comprise a hollow cavity capable of receiving at least a portion of the shaft;
    wherein said supporting body comprises a tubular appendix projecting inside said pipe;
    wherein said axial guide means is positioned radially between said stem of said shutter and said tubular appendix;
    wherein said axial guide means is configured to render said shutter angularly fixed; and
    wherein said sealing means comprises a first annular edge and a second annular edge opposite each other; the first edge positioned axially between said stem and said head of said shutter; and the second edge positioned radially between an appendix of said supporting body and said pipe.

* * * * *